(12) United States Patent
Reissenweber

(10) Patent No.: US 8,968,826 B2
(45) Date of Patent: Mar. 3, 2015

(54) LAMINATED DECORATIVE STRIP AND METHOD FOR PRODUCING A LAMINATED DECORATIVE STRIP

(75) Inventor: Dirk Reissenweber, Ebersdorf (DE)

(73) Assignee: Kunststoff-Technik Scherer & Trier GmbH & Co KG, Michelau (DE)

( * ) Notice: Subject to any disclaimer, the term of this patent is extended or adjusted under 35 U.S.C. 154(b) by 1605 days.

(21) Appl. No.: 10/541,676

(22) PCT Filed: Jan. 13, 2004

(86) PCT No.: PCT/EP2004/000169
§ 371 (c)(1),
(2), (4) Date: Jul. 8, 2005

(87) PCT Pub. No.: WO2004/062831
PCT Pub. Date: Jul. 29, 2004

(65) Prior Publication Data
US 2006/0127646 A1 Jun. 15, 2006

(30) Foreign Application Priority Data

Jan. 13, 2003 (DE) .................................. 103 00 919
Jan. 13, 2003 (DE) .............................. 203 00 435 U

(51) Int. Cl.
*B44C 1/14* (2006.01)
*B60R 13/04* (2006.01)
(Continued)

(52) U.S. Cl.
CPC . *B44C 1/14* (2013.01); *B60R 13/04* (2013.01); *B32B 2311/24* (2013.01); *B32B 15/08* (2013.01);
(Continued)

(58) Field of Classification Search
USPC ................ 427/147–149, 209–211, 156, 275; 72/46; 29/904, 17.1–17.3; 264/214, 264/171.14, 171.21; 156/219, 244.25, 156/244.12
See application file for complete search history.

(56) References Cited

U.S. PATENT DOCUMENTS 1,856,928 A * 5/1932 Pannier, Jr. ..................... 101/28
2,850,999 A * 9/1958 Kaplan et al. ................ 29/469.5
(Continued)

FOREIGN PATENT DOCUMENTS

DE 1800639 U 11/1959
DE 1242355 6/1967
(Continued)

OTHER PUBLICATIONS

Office Action issued in EP 04701588.8, dated Dec. 15, 2008, 32 pages.
(Continued)

*Primary Examiner* — Alex A Rolland
(74) *Attorney, Agent, or Firm* — Rothwell, Figg, Ernst & Manbeck PC

(57) ABSTRACT

The invention relates to a laminated strip, in particular a decorative strip, comprising an upper layer (12) consisting of metal, preferably aluminum, whose upper face (22) is embossed with a structure in relief (18) and whose underside (24) is fixed to a reinforcement layer (14) consisting of plastic. During the production of the strip, the reinforcement layer (14) and the protective layer (16) are applied after the structure in relief (18) has been embossed on the upper layer (12).

15 Claims, 1 Drawing Sheet

Figure 1:
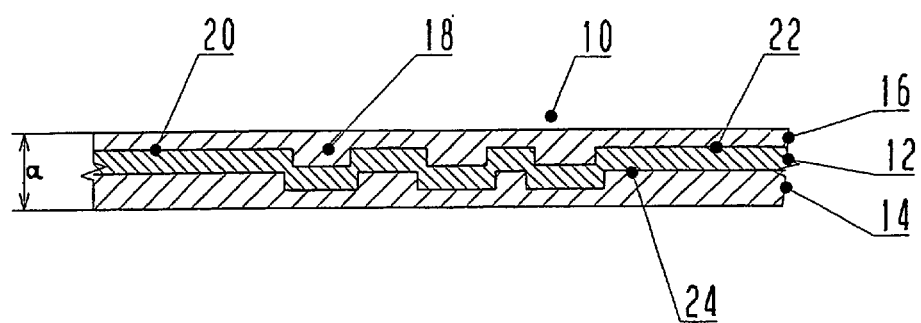

(51) Int. Cl.
*B32B 15/08* (2006.01)
*B60R 13/00* (2006.01)
*B32B 3/28* (2006.01)
*B44B 5/00* (2006.01)
*B60R 13/02* (2006.01)
*B32B 17/10* (2006.01)
*B32B 27/36* (2006.01)
*B32B 38/06* (2006.01)
*B32B 37/15* (2006.01)

(52) U.S. Cl.
CPC . *B60R 13/00* (2013.01); *B32B 3/28* (2013.01); *B44B 5/00* (2013.01); *B32B 37/153* (2013.01); *B60R 13/02* (2013.01); *B32B 2451/00* (2013.01); *B32B 17/10018* (2013.01); *B32B 27/36* (2013.01); *B32B 38/06* (2013.01)
USPC ........... 427/210; 427/264; 427/270; 427/275; 427/276; 427/277; 427/287; 427/327; 427/355; 427/409; 156/209; 29/17.3; 72/46

(56) References Cited

U.S. PATENT DOCUMENTS

| | | | | |
|---|---|---|---|---|
| 3,136,676 | A | * | 6/1964 | Fisch et al. ............... 264/171.12 |
| 3,150,707 | A | | 9/1964 | Howell |
| 3,246,066 | A | | 4/1966 | Gits |
| 3,301,703 | A | | 1/1967 | Owen |
| 3,565,734 | A | | 2/1971 | Shanok et al. |
| 3,745,056 | A | * | 7/1973 | Jackson ......................... 428/157 |
| 3,780,152 | A | | 12/1973 | Friesner |
| 3,811,989 | A | | 5/1974 | Hearn et al. |
| 3,980,512 | A | | 9/1976 | Rauser |
| 4,220,681 | A | | 9/1980 | Narita |
| 4,231,831 | A | | 11/1980 | Gebhardt |
| 4,253,597 | A | * | 3/1981 | Waffner ........................... 226/40 |
| 4,402,778 | A | * | 9/1983 | Goldsworthy ................ 156/172 |
| 4,409,276 | A | | 10/1983 | Martinelli et al. |
| 4,433,565 | A | | 2/1984 | Preller |
| 4,556,588 | A | | 12/1985 | Rockwood |
| 4,556,688 | A | | 12/1985 | McCready et al. |
| 4,560,596 | A | | 12/1985 | Coscia |
| 4,775,559 | A | | 10/1988 | Kanamori |
| 4,918,800 | A | | 4/1990 | Reafler |
| 4,923,572 | A | | 5/1990 | Watkins et al. |
| 4,997,505 | A | * | 3/1991 | Ibsen et al. .................... 156/220 |
| 5,100,732 | A | | 3/1992 | Benefiel |
| 5,176,755 | A | | 1/1993 | Winkle, Sr. et al. |
| 5,919,517 | A | * | 7/1999 | Levendusky et al. ......... 427/211 |
| 5,932,150 | A | | 8/1999 | Lacey |
| 6,164,548 | A | * | 12/2000 | Curiel .......................... 235/487 |
| 6,187,455 | B1 | | 2/2001 | Eschauzier |
| 6,270,869 | B1 | * | 8/2001 | Zeiter et al. .................... 428/35.8 |
| 6,555,615 | B2 | * | 4/2003 | Van Rheenen ................ 524/606 |

FOREIGN PATENT DOCUMENTS

| | | |
|---|---|---|
| DE | 1288298 B | 1/1969 |
| DE | 1943138 A1 | 3/1971 |
| DE | 2813636 A1 | 4/1979 |
| DE | 31 47 043 A | 6/1983 |
| DE | 3147043 A1 | 6/1983 |
| DE | 3203801 A1 | 8/1983 |
| DE | 39 40 628 A | 7/1990 |
| DE | 3940628 A1 | 7/1990 |
| DE | 4029701 A1 | 3/1992 |
| DE | 9321214 U1 | 10/1996 |
| DE | 199 24 604 A1 | 12/2000 |
| DE | 20016842 U1 | 12/2000 |
| EP | 1 525 092 | 9/1978 |
| EP | 1 533 658 | 11/1978 |
| EP | 0381856 A2 | 8/1990 |
| EP | 0736585 A1 | 10/1996 |
| EP | 1 129 952 A | 9/2001 |
| EP | 1129952 A2 | 9/2001 |
| EP | 1 587 694 B1 | 10/2005 |
| EP | 1 880 869 B1 | 1/2008 |
| GB | 814565 A | 6/1959 |
| GB | 857814 | 1/1961 |
| GB | 930 062 A | 7/1963 |
| GB | 930062 | 7/1963 |
| GB | 1076033 | 7/1967 |
| GB | 1525092 | 9/1978 |
| GB | 1533658 | 11/1978 |
| GB | 2360011 A | 9/2001 |
| JP | 4026290 | 9/1965 |
| JP | 40-26290 U | 9/1966 |
| JP | 60046822 A | 3/1985 |
| JP | 60176845 A | 9/1985 |
| JP | 03087227 A | 12/1991 |
| WO | WO 90/03267 A1 | 4/1990 |
| WO | 9413497 A1 | 6/1994 |

OTHER PUBLICATIONS

Korean Intellectual Property Office Non-Final Rejection dated Nov. 22, 2011.
European Patent Office Communication, EP 04701588.8, Feb. 27, 2014, 2 pages.
Third Party Observation, EP 04701588.8, submitted to EPO Feb. 19, 2014, 16 pages.
European Patent Office Communication, EP 07018211.8, Feb. 7, 2014, 3 pages.
Opposition Comments, EP 07018211.8, submitted to EPO Feb. 4, 2014, 28 pages.
Vieweg, "Kunststoff-Handbuch, Band I Grundlagen" Carl Hanser Verlag Munchen Wien (1975), 3 pages.
Official Communication from European Patent Office dated Oct. 9, 2012, issued in corresponding European Patent Application No. 07 018 211.8, along with English language machine translation, 13 pages.
Official Communication from European Patent Office dated Mar. 20, 2012, issued in corresponding European Patent Application No. 07 018 211.8, along with English language machine translation, 26 pages.
Office Action issued in corresponding U.S. Appl. No. 12/535,884, on Jun. 6, 2014, 17 pages.
Office Action issued in corresponding U.S. Appl. No. 12/535,884, on Dec. 31, 2013, 13 pages.
Office Action issued in corresponding U.S. Appl. No. 12/535,884, on Jun. 27, 2013, 19 pages.
Office Action issued in corresponding U.S. Appl. No. 12/535,884, on Oct. 27, 2010, 31 pages.
Office Action issued in corresponding U.S. Appl. No. 12/535,884, on Apr. 5, 2010, 21 pages.
Saechtling, "Kunststoff-Taschenbuch," section 3.6.1, edition 25 (1992), 5 pages.
Search Report and English language translation from corresponding German Application No. 20300435.3, dated Aug. 19, 2003, 6 pages.
Information by Third Party filed on behalf of Weidmann Plastics Technology AG, filed in EPO Opposition Proceeding concerning EP 1587694 B1, Aug. 29, 2011, along with English language machine translations, 98 pages.
"Brockhaus der Naturwissenschaften und der Technik," Eberhard Brockhaus Wiesbaden, 1951, 2 pages.
Official Communication from European Patent Office dated Dec. 16, 2010, issued in corresponding European Patent Application No. 07018211.8, along with English language machine translation, 39 pages.
Official Communication from European Patent Office dated Feb. 7, 2014, issued in corresponding European Patent Application No. 07018211.8, along with English language machine translation, 61 pages.
Official Communication from European Patent Office dated Feb. 27, 2014, issued in corresponding European Patent Application No. 04701588.8, along with English language machine translation, 40 pages.
Final Office Action issued in U.S. Appl. No. 12/535,884, 20 pages (Dec. 29, 2014).

* cited by examiner

LAMINATED DECORATIVE STRIP AND METHOD FOR PRODUCING A LAMINATED DECORATIVE STRIP

CROSS REFERENCE TO RELATED APPLICATION

This application is a 35 USC §371 National Phase Entry Application from PCT/EP2004/000169, filed Jan. 13, 2004, and designating the United States.

The present invention relates to a laminated strip, in particular a decorative strip, comprising an upper layer consisting of metal whose upper face is embossed with a structure in relief, as well as a production method for the aforementioned type of decorative strip.

These decorative strips are used in automotive production, for example, where they can be attached to sills as the upper cover. Aluminum is frequently used for the decorative area to lend the decorative strip an appealing appearance. A structure in relief is developed in the aluminum surface, such as a name or a manufacturer's trademark, for example. In addition to automotive construction, these decorative strips are also used as brand signs and/or labels for technical equipment of all types. What comes to mind here are domestic appliances (refrigerators, freezers, dishwashers, etc.), sanitary equipment (shower handle and/or shower stall, etc.).

If these decorative strips are made completely of aluminum, a specific minimum thickness of the aluminum sheet of approx. 1.5 mm is required to obtain a sufficiently sturdy decorative strip that retains an embossed structure permanently in an appealing fashion. Because the embossing depth of the structure in relief is generally no more than 0.2 mm, a relatively high quantity of aluminum is required compared to the "visible" surface area. This relatively high and principally superfluous aluminum portion represents on the one hand a significant cost factor for these decorative strips and furthermore also drastically increases the weight of these decorative strips. When taking into consideration that these decorative strips, although they are mass items, should provide a high-quality appearance but contribute only insignificantly to the production costs, the value of reducing material costs becomes readily apparent. But replacing the non-visible portion of the aluminum with other materials that are lighter and/or less expensive (such as plastic, for example) presents the problem that a simple embossing of sharp-drawn structures in relief is no longer successful because of the varying bonding ability between the individual components of these of composite work pieces. For this reason, it is not possible to obtain optically appealing results in the embossing process.

Another option in the surface treatment of a work piece such as a decorative strip is to etch the desired structure into the metal surface. However, with this method, the fact that etching requires a relatively high production effort because at least one additional work step is required to coat the surface area with a masking layer is a disadvantage. Another disadvantage is that the aluminum surface would be completely bare and not protected against corrosion after the etching process. Therefore, it is absolutely crucial that a corrosion protection is applied after the etching process by anodizing or varnishing, which again results in significant additional costs. Also, varnishing would flood the matting introduced earlier by the relief etching. The result would detract from a high-quality appearance.

The problem to be solved by the present invention is therefore to provide a decorative strip of the aforementioned type where an appealing surface structure in relief can be developed with a reduced mass of metal, as well as a production method for a decorative strip of the aforementioned type.

To solve the aforementioned problem, the present invention provides a laminated strip, in particular a decorative strip that comprises an upper layer consisting of metal, preferably of aluminum. A structure in relief is embossed into the upper face of the upper layer and the underside is firmly fixed to a reinforcement layer consisting of plastic. It is especially advantageous if the reinforcement layer is fixed to the upper layer after said upper layer has already been formed with the structure in relief. Because the structure in relief is embossed here in the upper layer consisting of metal as long as said upper layer is not yet connected to the reinforcement layer consisting of plastic, exact and sharp contours can be obtained in a very simple manner by means of an embossing procedure. An additional advantage is that the upper layer consisting of metal is relatively thin in the strip in accordance with the invention. During the embossing process, the embossing stamp presses the thin strip, for example an aluminum strip which forms the upper layer, against a counterpart of complementary shape, thus also allowing the reproduction of more complex structures in relief—the reinforcement layer consisting of plastic, on the other hand, would impair the relief formation during the embossing, in particular in the area of sharp edges. Also, it would have to be expected that the cohesion between the reinforcement layer and the upper layer may suffer after embossing, at least in some places.

The application of the reinforcement layer consisting of plastic to the upper layer consisting of metal, which has already been treated in this way, may be effected such that the upper face, which carries the structure in relief, is not altered. In this way, it is possible to produce a light and cost-effective metal strip because the quantity of metal required for the production of a metal strip is reduced to a fraction compared to a conventional metal strip. If aluminum is used, it can also be guaranteed that a coating of the upper face (visible face), which protects against corrosion, remains intact in the production of the strip.

An extrusion method would be appropriate for attaching the reinforcement layer to the upper layer, with the reinforcement layer being available in plasticized form in an extruder and being attached to the upper layer with extrusion coating. Extrusion methods are particularly suitable for the production of mass items because this type of production can achieve a high through-put of produced items.

Only a slight thickness of the upper layer is required to develop a clean surface area with sharply embossed structures in relief, and therefore it is favorable if the thickness of the upper layer is less than 1 mm, preferably less than 0.4 mm. The depth of the structure in relief should not be greater than 0.5 mm, preferably not greater than 0.2 mm.

The thickness of the reinforcement layer should be appropriate to obtain a strip that is sufficiently dimensionally stable as well as sufficiently resistant. It is desirable, however, for the strip to retain some flexibility, and thus the thickness of the reinforcement layer should be favorably ≤1 mm, preferably ≤0.6 mm.

The stability of the strip can be improved even further if the reinforcement layer contains fibers, preferably mineral fibers. These fibers can help to adjust the thermal longitudinal expansions of the metallic upper layer and the reinforcement layer consisting of plastic.

The reinforcement layer advantageously consists of polyvinylchloride (PVC), acrylnitrilbutadienstyrol (ABS), polyamide (PA) or polypropylene (PP). Each of these synthetic materials is relatively easy to handle in the extrusion process and has sufficient strength at an appropriate thickness (in the range of 1 mm or less). This applies in particular if a fiber-type material is mixed into the respective synthetic material.

To protect the structure in relief in the upper face of the upper layer, it may be provided to arrange another, transparent plastic layer on the upper face of the upper layer. This additional plastic layer preferably consists of polyvinylchloride (PVC), acryinitrilbutadienstyrol (ABS), polyamide (PA) or polypropylene (PP). Advantageously, it has a thickness of ≤0.5 mm, preferably of ≤0.2 mm. The additional plastic layer may also be extrusion-coated on the upper face of the upper layer. It is especially favorable to simultaneously extrusion-coat the reinforcement layer on the underside of the upper layer and the additional plastic layer on the upper face of the upper layer in a single extrusion machine, thus making an additional production step obsolete.

To improve the bond between the upper layer consisting of metal and the reinforcement layer consisting of plastic, it may be provided that an adhesive varnish is applied to the underside of the upper layer. Additionally, it may be provided that a protective varnish is applied to the upper face of the upper layer, which, for example, protects the visible surface of the upper layer against external influences (in particular UV radiation and the use of road salt). Furthermore, said protective varnish can be used as a design element by adding minerals or colors.

Attaching the laminated strip to its final substrate may be achieved with gluing (such as a double-sided glue strip) or by clip attachment or welding to the final substrate.

It is also conceivable to reinforce the strip into a load-bearing element for another application, for example in construction.

To produce the laminated decorative strip in accordance with the invention, a method comprising the following steps is proposed:
a) Embossing a structure in relief into the upper face of the upper layer, and
b) then attaching a reinforcement layer consisting of plastic to the upper layer.

It has already been explained that particularly by embossing the structure in relief into the upper layer consisting of metal as long as said metal layer is not yet attached to the reinforcement layer consisting of plastic, the development of exact and sharp contours is possible in a very simple manner with an embossing process, even more so because the upper layer consisting of metal is supposed to be as thin as possible. For an optimally adhesive attachment of the reinforcement layer consisting of plastic at the treated upper layer, suitable methods are those where the structure in relief in the upper face of the upper layer is not undergoing any more changes. In particular suitable for this purpose are extrusion processes, with the reinforcement layer consisting of plastic being attached by extrusion-coating in step b).

Because the extrusion process is principally a continuous production process where a specified quantity of a final product is generated from a specific quantity of starter materials to be added at each specified time unit, it is not readily possible to combine said extrusion process with an embossing process, which—at least if the embossing image is supposed to meet high quality standards—a discontinuous production method. In the present case, this presents the problem that during the embossing of the structure in relief on the metal upper layer, the movement of the metal upper layer is subjected to a constant change of stopping and pressing the embossing stamp and continuing the feed, whereas it has to be moved through the extruder at a constant transport speed. To coordinate these different movement types of the upper layer in the production process, it therefore may be provided that the reinforcement layer is attached to the upper layer immediately after the structure in relief is embossed, with the upper layer passing through at least one buffer arrangement where it can collect from time to time after the embossing and prior to attaching the reinforcement layer. This can be realized, for example, in that the upper layer forms a loop-like arrangement between the embossing unit and the extruder (such as simply slacking to a certain degree), which alternately gets bigger and smaller periodically.

If another plastic layer is arranged as protective layer at the upper face of the upper layer, it is furthermore advantageous to attach said additional plastic layer to the upper layer also by extrusion-coating in step b). A dual extruder may be provided for this purpose, which has two oppositely arranged extrusion heads between which the upper layer is transported. In this way, the reinforcement layer as well as the protective layer can be coated in a single operation.

To protect the upper layer and the structure in relief embossed therein from external influences, such as UV radiation and corrosion, a protective varnish may be applied to the surface of the upper layer. The method in accordance with the invention offers the option to apply said protective varnish on the upper layer already prior to embossing the structure in relief because the embossing process will not damage the protective varnish layer. Strips already treated with a protective varnish, such as aluminum strips available commercially from strip manufacturers at low cost, may be used.

In the same way, an adhesive varnish can be applied to the underside of the upper layer—if desired, already prior to embossing—which is supposed to effect a particularly strong adhesion of the reinforcement layer to the upper layer. These strips, as well as strips having a protective varnish on one side and an adhesive varnish on the other side, are also commercially available at a low cost.

An embodiment of the invention is described in detail in the following by means of the included illustrations. They show:
FIG. 1 a longitudinal section through a laminated strip in accordance with the invention; and
FIG. 2 an extremely simplified schematic representation of an arrangement for the production of the strip in accordance with the invention in cross-sectional view.

FIG. 1 shows a section through a laminated strip 10 in accordance with the invention in longitudinal view. The strip 10 in accordance with the invention is comprised of three layers, i.e., a metal layer 12 consisting of aluminum arranged in the center, a reinforcement layer 14 consisting of plastic arranged under said metal layer, as well as another protective layer 16 arranged on top in FIG. 1. All three layers are fixed to one another adhesively, with the connection between the aluminum layer 12 and the reinforcement layer 14 being strong enough that the two layers 12, 14 are practically inseparable. The upper protective layer 16, on the other hand, is only loosely attached to the aluminum layer 12 and can be pulled off easily from the aluminum layer 12 by hand. The function of the protective layer 16, which preferably also consists of plastic, is primarily to protect the aluminum layer 12 from mechanical damage during the production process. A secondary function of the protective layer 16 is the protection until the strip 10 is finally affixed to an intended product.

The surface area 20 of the aluminum layer 12 furthermore has a structure in relief 18 created by embossing a specific text or graphic symbol into the thin aluminum sheet 12 before said aluminum sheet was attached to the two plastic layers 14, 16. After embossing of the structure in relief 18, the two plastic layers 14 and 16 were attached to the aluminum layer 12, for example by extrusion, such that they attach to said aluminum layer over the entire upper or lower area of the aluminum layer 12. As desired, the upper face 22 of the protective layer and/or the underside 24 of the reinforcement layer 14 may be smooth or also have the contours of the structure in relief—perhaps also in a weakened form.

The overall thickness a of the laminated strip 10 shown in FIG. 1 is 1.2 mm, with the upper protective layer 16 consisting of plastic having a thickness of 0.2 mm, the aluminum layer 12 having a thickness of 0.4 mm and the lower reinforcement layer 14 consisting of plastic having a thickness of 0.6 mm. The upper plastic layer 16 is transparent and made of polyvinylchloride. It has a relatively low stiffness and thus forms a protective film for the aluminum layer 12. The lower reinforcement layer 14 is made of polypropylene and contains mineral fibers that prevent an expansion and/or deformation of the lower reinforcement layer 14, in particular in longitudinal direction of the strip 10. The stiffness of the lower reinforcement layer 14 is clearly higher than that of the upper protective layer 16, so that the lower reinforcement layer 14 provides overall stability to the strip 10 as well as the embossed structure in relief of the aluminum layer 12. Nevertheless, the strip 10 remains flexible enough that its upper surface can adapt to curved substrates.

Figure 2:
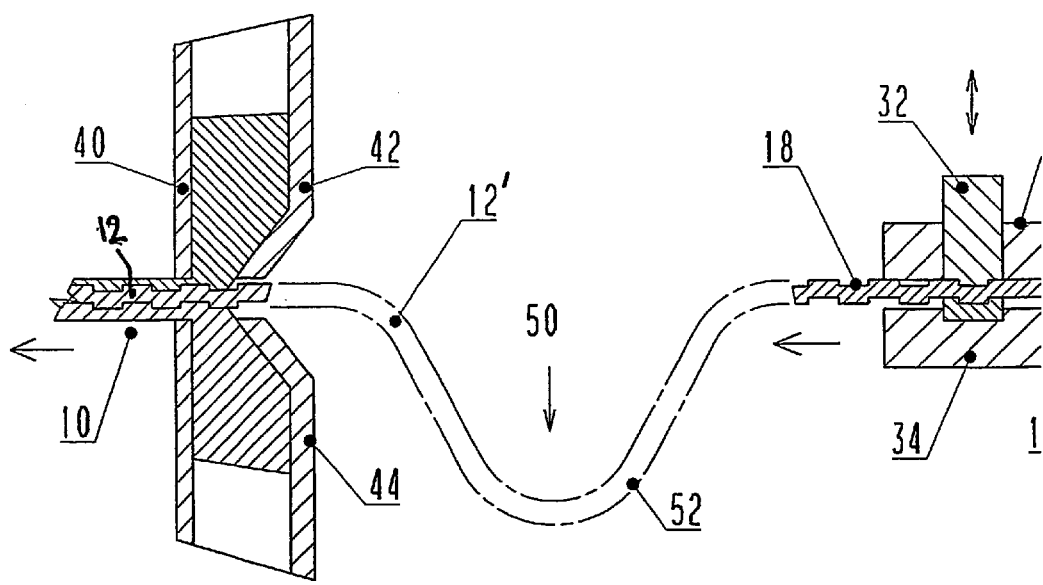

FIG. 2 shows, in cross-sectional view and extremely simplified form, a device by means of which the strip 10 in accordance with the invention can be produced. The production device essentially comprises an embossing unit 30 to which the thin aluminum strip 12', which forms the aluminum layer 12, is fed for embossing the structure in relief 18, as well as an extrusion unit 40, in which the reinforcement layer 14 and/or the protective layer 16 is extrusion-coated on the aluminum strip 12' with the embossed structure in relief 18 from the top or the bottom respectively. Furthermore, the production arrangement shown in FIG. 2 comprises a buffer arrangement 50 between the embossing unit 30 and the extrusion unit 40, where the aluminum strip 12' forms a downward hanging loop 52.

In the embossing unit 30, the structure in relief 18 is embossed on the aluminum strip 12' by pressing an upper stamp 32 on an associated, complementary formed lower stamp 34. To that end, the aluminum strip 12', which has not yet been embossed, is introduced into the embossing unit 30 in a first step and then stopped, the upper stamp 32 is pressed down against the lower stamp 34 and released, and then the movement of the aluminum strip 12' continues to the left in FIG. 2, with the relief that was just embossed being transported simultaneously out of the stamp area and the next area of the aluminum strip 12' to be embossed being inserted into the stamp matrices between the upper stamp 32 and the lower stamp 34. Because the aluminum strip 12' has a relatively small thickness, it is not problematic to generate an embossing structure with sharply defined edges.

In the extrusion unit 40, plastic layers are then extrusion-coated on the respective underside 24 and upper face 22 of the aluminum strip 12', which bears the intended structure in relief 18. For this purpose, the extrusion unit 40 comprises a first extrusion head 42 as well as a second extrusion head 44, which are arranged opposite to one another and between which the aluminum strip 12' is transported in such a way that its underside 24 faces the lower extrusion head 44 and its upper face 22 faces the upper extrusion head 42. The lower extrusion head 44 contains plasticized polypropylene with added mineral fibers to form the reinforcement layer 14. The upper extrusion head 42 contains plasticized polyvinylchloride to form the protective layer 16 on the upper face 22 of the aluminum strip 12'. Both layers 14, 16 are extrusion-coated with the known methods.

In the extrusion unit 40, the aluminum strip 12' is processed into the final laminated strip 10 in a continuous manner, i.e., in FIG. 2, the aluminum strip 12' moves through the extrusion unit 40 toward the left at a constant speed. Thus, it is up to the buffer arrangement 50 to coordinate the two different types of movement of the aluminum strip 12' in the embossing unit 30 (discontinuous movement) and in the extrusion unit 40 (movement at constant speed) in that the aluminum strip 12' can form a more or less hanging loop 52 in the area of the buffer arrangement 50.

To attach the reinforcement layer 14 permanently to the underside of the aluminum strip 12', an adhesive varnish has been applied to the underside of the aluminum strip 12'. A protective varnish is applied to the upper face of the aluminum strip 12' to protect the upper face of the aluminum strip 12' and its embossed structure in relief 18 from damage caused by external influences (in particular UV radiation and corrosion). The two aforementioned varnishes are applied to the metal strip prior to the embossing process. Varnished metal strips of this type are available from metal strip manufacturers.

The laminated strip, which was produced as described above and has at least two layers, is characterized by low material- and production costs and a high dimensional stability, as well as by a particularly appealing look because it can be provided with a complex embossing relief.

The invention claimed is:

1. Method for the production of a multilayered strip comprising an upper layer consisting of metal, the method comprising the following steps:
    a. embossing a metal strip as the upper layer to form a three-dimensional relief into an upper face of the metal strip;
    b. fixing a plastic reinforcement layer to the lower side of the embossed metal strip; and
    c. releasable fixing an additional plastic layer to the upper face of said metal strip, said additional plastic layer being loosely bonded to the metal strip so as to be detachable by hand, wherein in said steps (b) and (c) said plastic reinforcement layer and said additional plastic layer are fixed to said metal strip by extrusion-coating.

2. Method in accordance with claim 1, wherein a protective varnish is applied on the upper face of the upper layer prior to embossing the structure in relief.

3. Method in accordance with claim 1, wherein an adhesive varnish is applied to the underside of the upper layer prior to embossing the structure in relief.

4. Method in accordance with claim 1, wherein the reinforcement layer is attached after the upper layer passes through at least one loop-like arrangement, wherein the loop-like arrangement is located after embossing of the structure in relief and prior to attaching the reinforcement layer.

5. Method in accordance with claim 4, wherein the upper layer runs as a slack loop in the area of the loop-like arrangement.

6. Method in accordance with claim 4, wherein the upper layer is stopped during embossing of the structure in relief in an embossing unit employing an upper stamp and a lower stamp.

7. The method in accordance with claim 6 wherein the reinforcement layer has a thickness range of about 0.6 mm to 1 mm.

8. The method according to claim 6, wherein the three-dimensional relief is embossed on the metal strip by pressing the upper stamp on the associated complementary formed lower stamp.

9. The method according to claim 8, wherein the metal strip forms a downward hanging loop.

10. A method according to claim 1 wherein the metal is aluminum.

11. A method according to claim 1 wherein the multilayered strip is a decorative metal strip.

12. Method in accordance with claim 1, wherein the reinforcement layer contains fibers.

13. Method in accordance with claim 12, wherein the fibers are mineral fibers.

14. Method in accordance with claim 1 wherein the reinforcement layer is sufficiently dimensionally stable to prevent expansion and/or deformation of the strip.

15. Method in accordance with claim 1 wherein the strip has the flexibility to adapt to curved substrates.

* * * * *